United States Patent
Wu et al.

(10) Patent No.: US 12,276,580 B2
(45) Date of Patent: Apr. 15, 2025

(54) PUMP HEALTH ANALYSIS METHOD AND PUMP HEALTH ANALYSIS DEVICE USING THE SAME

(71) Applicant: UNITED MICROELECTRONICS CORP., Hsinchu (TW)

(72) Inventors: Wei-Chen Wu, Taitung (TW); Cheng-Tai Peng, Hsinchu County (TW); Chih-Chung Kuo, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 328 days.

(21) Appl. No.: 17/983,423

(22) Filed: Nov. 9, 2022

(65) Prior Publication Data
US 2024/0094094 A1 Mar. 21, 2024

(30) Foreign Application Priority Data
Sep. 21, 2022 (CN) .......................... 202211153487.8

(51) Int. Cl.
*G01M 99/00* (2011.01)
*G01H 13/00* (2006.01)
*G06N 20/00* (2019.01)

(52) U.S. Cl.
CPC .......... *G01M 99/005* (2013.01); *G01H 13/00* (2013.01); *G06N 20/00* (2019.01)

(58) Field of Classification Search
CPC ............. G01M 99/005; G01M 99/007; G01M 99/008; F04B 2201/0802; F04B 2201/0806; F04B 51/00; F01B 49/103; F04D 15/0088
See application file for complete search history.

(56) References Cited

U.S. PATENT DOCUMENTS

| | | | | |
|---|---|---|---|---|
| 5,825,657 A * | 10/1998 | Hernandez | .......... | G01M 13/028 702/182 |
| 6,330,525 B1 * | 12/2001 | Hays | .......... | F04D 15/0088 702/182 |
| 7,013,223 B1 * | 3/2006 | Zhang | .......... | F02M 65/003 702/34 |
| 7,031,873 B2 * | 4/2006 | Song | .......... | G01P 3/44 702/145 |
| 7,653,512 B2 | 1/2010 | Cheung et al. | | |
| 7,664,618 B2 | 2/2010 | Cheung et al. | | |
| 8,190,592 B1 * | 5/2012 | Bayardo | .......... | G06F 16/3347 707/706 |
| 8,401,806 B2 * | 3/2013 | Borsting | .......... | F04D 15/0088 702/56 |
| 10,119,537 B2 * | 11/2018 | Wetherill | .......... | F04B 49/06 |
| 10,311,703 B1 * | 6/2019 | Hayzen | .......... | G06F 16/21 |

(Continued)

*Primary Examiner* — Tran M. Tran
(74) *Attorney, Agent, or Firm* — WPAT, PC (57) ABSTRACT

A pump health analysis method and a pump health analysis device using the same are provided. A standard vibration curve of a standard pump is obtained. The standard vibration curve is converted from a time domain to a frequency domain to obtain a first frequency distribution curve. A sample vibration curve of a sample pump is obtained. The sample vibration curve is converted from the time domain to the frequency domain to obtain a second frequency distribution curve. The first frequency distribution curve is compared with the second frequency distribution curve by using a cosine similarity algorithm to obtain a health index of the sample pump.

18 Claims, 5 Drawing Sheets

(56) References Cited

U.S. PATENT DOCUMENTS

| | | | |
|---|---|---|---|
| 10,316,849 B2* | 6/2019 | Munk | G01M 99/008 |
| 10,393,621 B2* | 8/2019 | Jaramillo-Velasques | G06N 3/08 |
| 10,458,224 B2* | 10/2019 | Dickenson | E21B 47/008 |
| 10,801,491 B2* | 10/2020 | Urdaneta | E21B 43/2607 |
| 11,215,535 B2* | 1/2022 | Huang | B25J 9/1674 |
| 11,429,900 B1* | 8/2022 | Alvarenga Marinelli | H04R 3/005 |
| 11,493,404 B2* | 11/2022 | Tobon-Mejia | G01H 1/003 |
| 11,746,645 B2* | 9/2023 | Vittal | E21B 47/008 166/250.15 |
| 11,754,592 B1* | 9/2023 | Bechhoefer | G01P 15/097 702/69 |
| 12,067,486 B2* | 8/2024 | Liang | G06N 3/044 |
| 12,135,543 B2* | 11/2024 | Gabaldon | G01H 1/003 |
| 2005/0286753 A1* | 12/2005 | Ho | H04N 17/04 348/E17.005 |
| 2008/0234964 A1* | 9/2008 | Miyasaka | G01M 13/04 702/113 |
| 2010/0082275 A1* | 4/2010 | Borsting | F04D 15/0066 702/56 |
| 2015/0095100 A1* | 4/2015 | Vittal | G05B 23/0213 700/282 |
| 2018/0087499 A1* | 3/2018 | Zhang | F04B 49/08 |
| 2019/0287005 A1* | 9/2019 | Subramaniyan | G06N 5/04 |
| 2022/0018707 A1* | 1/2022 | Chen | G01H 1/06 |
| 2023/0307127 A1* | 9/2023 | Zhi | G16H 10/60 |

* cited by examiner

PUMP HEALTH ANALYSIS METHOD AND PUMP HEALTH ANALYSIS DEVICE USING THE SAME

This application claims the benefit of People's Republic of China application Serial No. 202211153487.8, filed Sep. 21, 2022, the subject matter of which is incorporated herein by reference.

BACKGROUND OF THE INVENTION

Field of the Invention

The invention relates in general to an analysis method and an analysis device using the same, and more particularly to a pump health analysis method and a pump health analysis device using the same.

Description of the Related Art

In a semiconductor factory, many items of semiconductor equipment are equipped with a pump to vacuum or ventilate the gas. However, if the pump suddenly breaks down after a long period of operation, the manufacturing process of semiconductor will be severely affected, and a whole batch of wafers may even be damaged.

Therefore, it has become a prominent task for the research personnel to develop and provide a technology for monitoring and predicting the health of the pump.

SUMMARY OF THE INVENTION

The invention is directed to a pump health analysis method and a pump health analysis device using the same capable of quickly analyzing the health state of a sample pump using a cosine similarity algorithm according to an analysis of comparison between the vibrations of the sample pump with the vibrations of a standard pump.

According to one embodiment of the present invention, a pump health analysis method is provided. The pump health analysis method includes the following steps. A standard vibration curve of a standard pump is obtained. The standard vibration curve is converted from a time domain to a frequency domain to obtain a first frequency distribution curve. A sample vibration curve of a sample pump is obtained. The sample vibration curve is converted from the time domain to the frequency domain to obtain a second frequency distribution curve. The first frequency distribution curve is compared with the second frequency distribution curve by using a cosine similarity algorithm to obtain a health index of the sample pump.

According to another embodiment of the present invention, a pump health analysis device is provided. The pump health analysis device includes a data reception unit, a conversion unit and a similarity analysis unit. The data reception unit is configured to obtain a standard vibration curve of a standard pump and a sample vibration curve of a sample pump. The conversion unit is configured to convert the standard vibration curve from a time domain to a frequency domain to obtain a first frequency distribution curve and to convert the sample vibration curve from the time domain to the frequency domain to obtain a second frequency distribution curve. The similarity analysis unit is configured to compare the first frequency distribution curve and the second frequency distribution curve by using a cosine similarity algorithm to obtain a health index of the sample pump.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
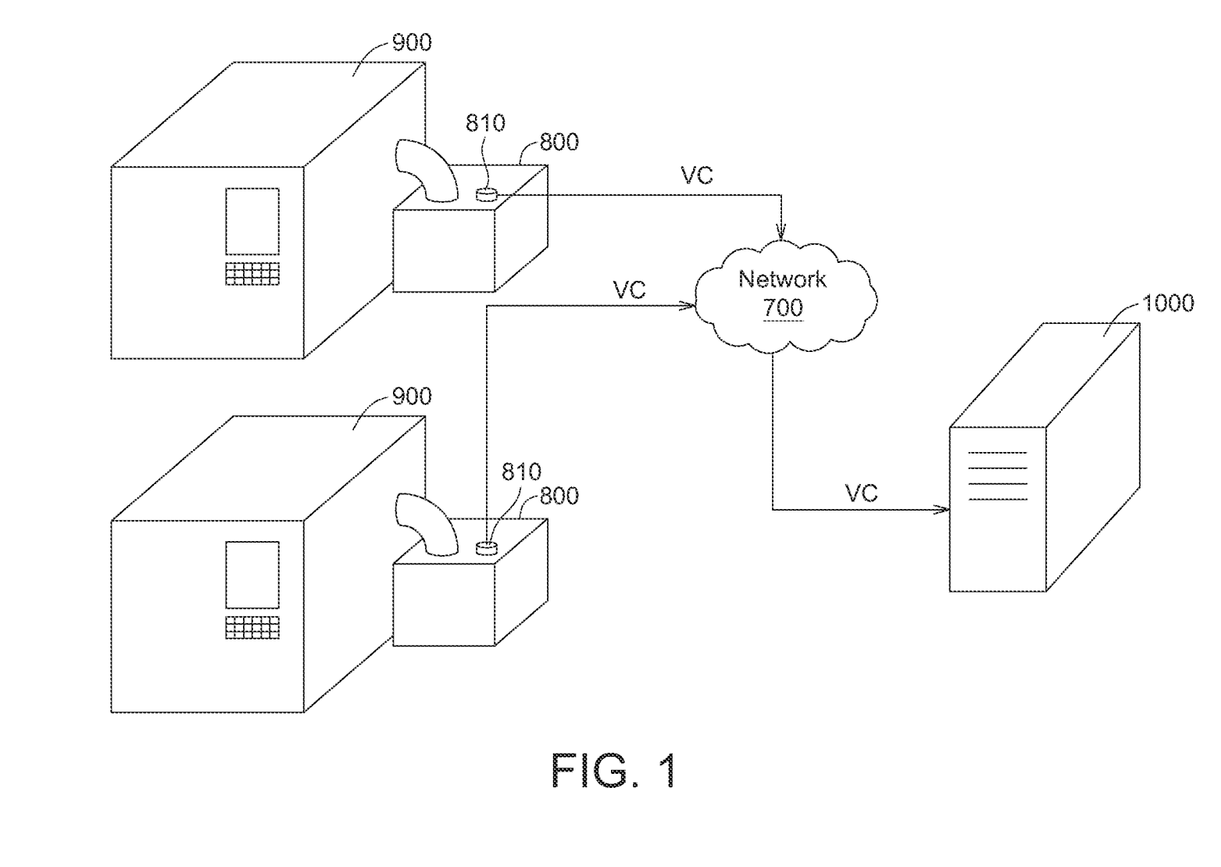
FIG. 1 is a schematic diagram of semiconductor equipment and pumps according to an embodiment.

Referring to FIG. 1, a schematic diagram of semiconductor equipment 900 and pumps 800 according to an embodiment is shown. Each of the pumps 800 is connected to the semiconductor equipment 900 to extract or vacuum the gas. For example, these pumps 800 could be identical and could be used for different kinds of semiconductor equipment 900.

After a long period of operations, the vibrations of the pump 800 may change. In the present embodiment, a vibration curve VC of the pump 800 is obtained by a vibration sensor 810. After the vibration curve VC is transmitted to a pump health analysis device 100 through a network 700, the health index of the pump 800 can be quickly analyzed according to the vibration curve VC.

Figure 2:
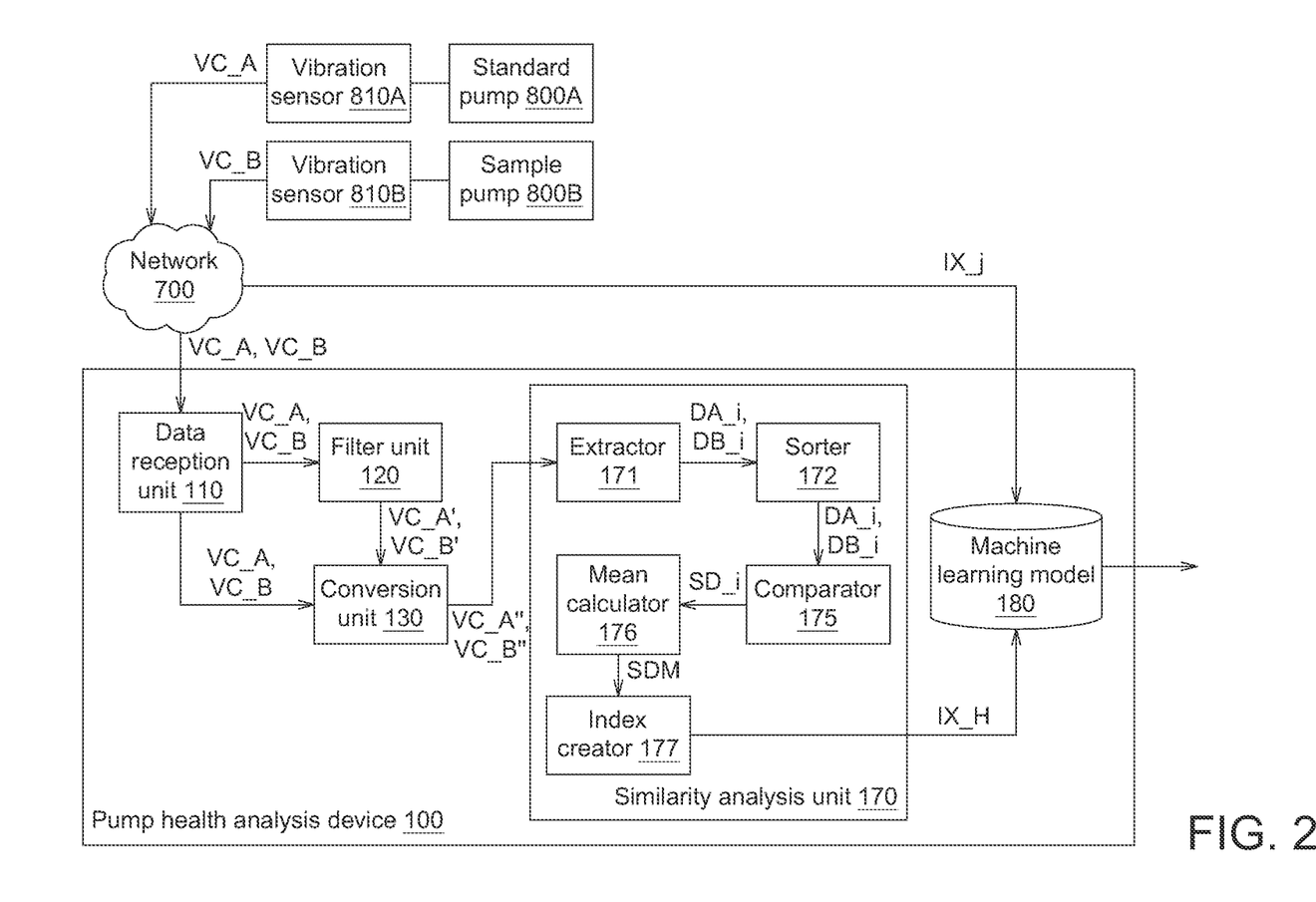
FIG. 2 is a block diagram of a pump health analysis device according to an embodiment.

Referring to FIG. 2, a block diagram of the pump health analysis device 100 according to an embodiment is shown. The pump health analysis device 100 includes a data reception unit 110, a filter unit 120, a conversion unit 130, a similarity analysis unit 170 and a machine learning model 180. Brief descriptions of the functions of each element are disclosed below. The data reception unit 110 is used to receive various types of data from such as a network transmission module, a transmission line, an LTE module, a Bluetooth module, or a combination thereof. The filter unit 120 is used to filter signals. The conversion unit 130 is used to convert signals. The similarity analysis unit 170 is used to analyze similarity. After the machine learning model 180 is trained, the machine learning model 180 can output forecasting information according to various characteristic indexes inputted thereto. The filter unit 120, the conversion unit 130, the similarity analysis unit 170 and machine learning model 180 could be realized by a chip, a circuit, a circuit board, a code, a storage device that stores the code, or a combination thereof.

The similarity analysis unit 170 includes an extractor 171, a sorter 172, a comparator 175, a mean calculator 176 and an index creator 177. The extraction element 171, the sorter 172, the comparator 175, the mean calculator 176 and the index creator 177 are used to execute various calculations of similarity analysis.

In the present embodiment, as indicated in FIG. 2, the standard pump 800A is a pump that has just been calibrated or new production, and therefore has the best state of health. The sample pump 800B is a pump to be measured. In the present embodiment, the health state of the sample pump 800B can be quickly analyzed according to a comparison between the sample pump 800B and the standard pump

800A. The operations of each element of the pump health analysis device 100 are disclosed below with a flowchart.

Figure 3:
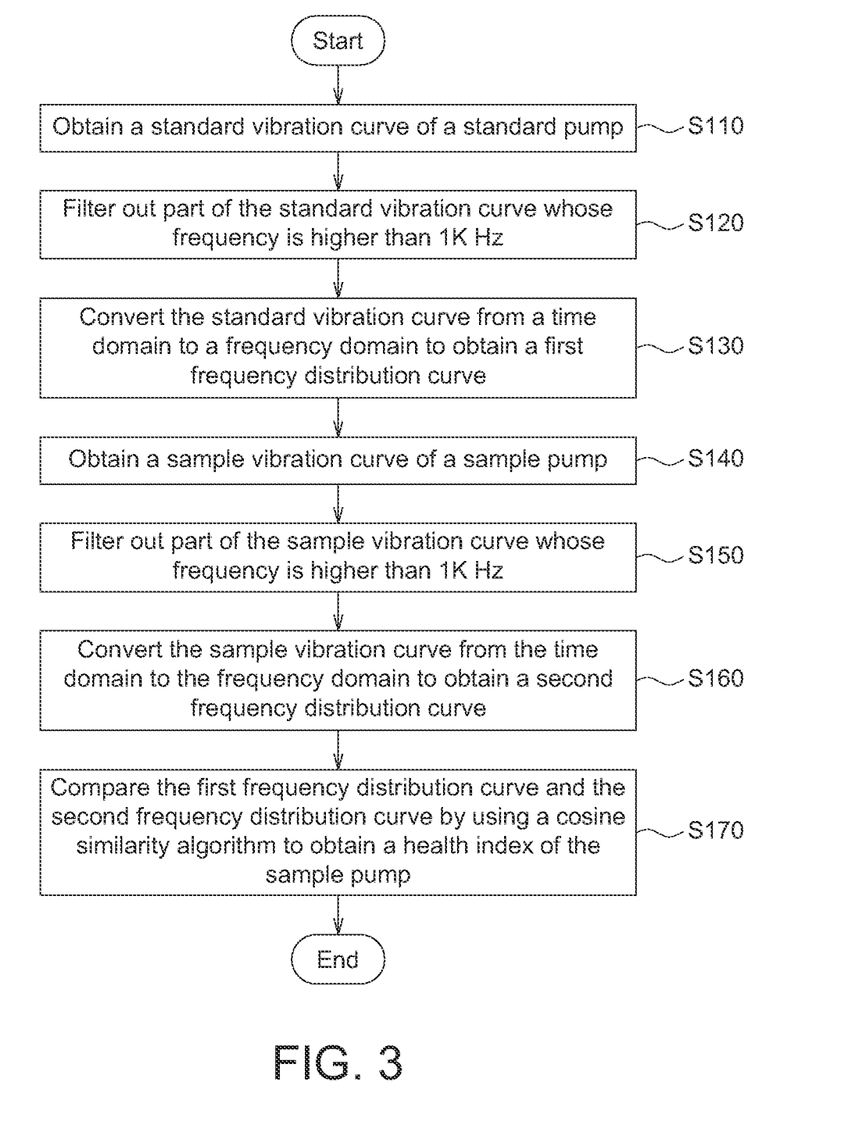
FIG. 3 is a flowchart of a pump health analysis method according to an embodiment FIG. 4 exemplifies each step of FIG. 3.
Figure 4:
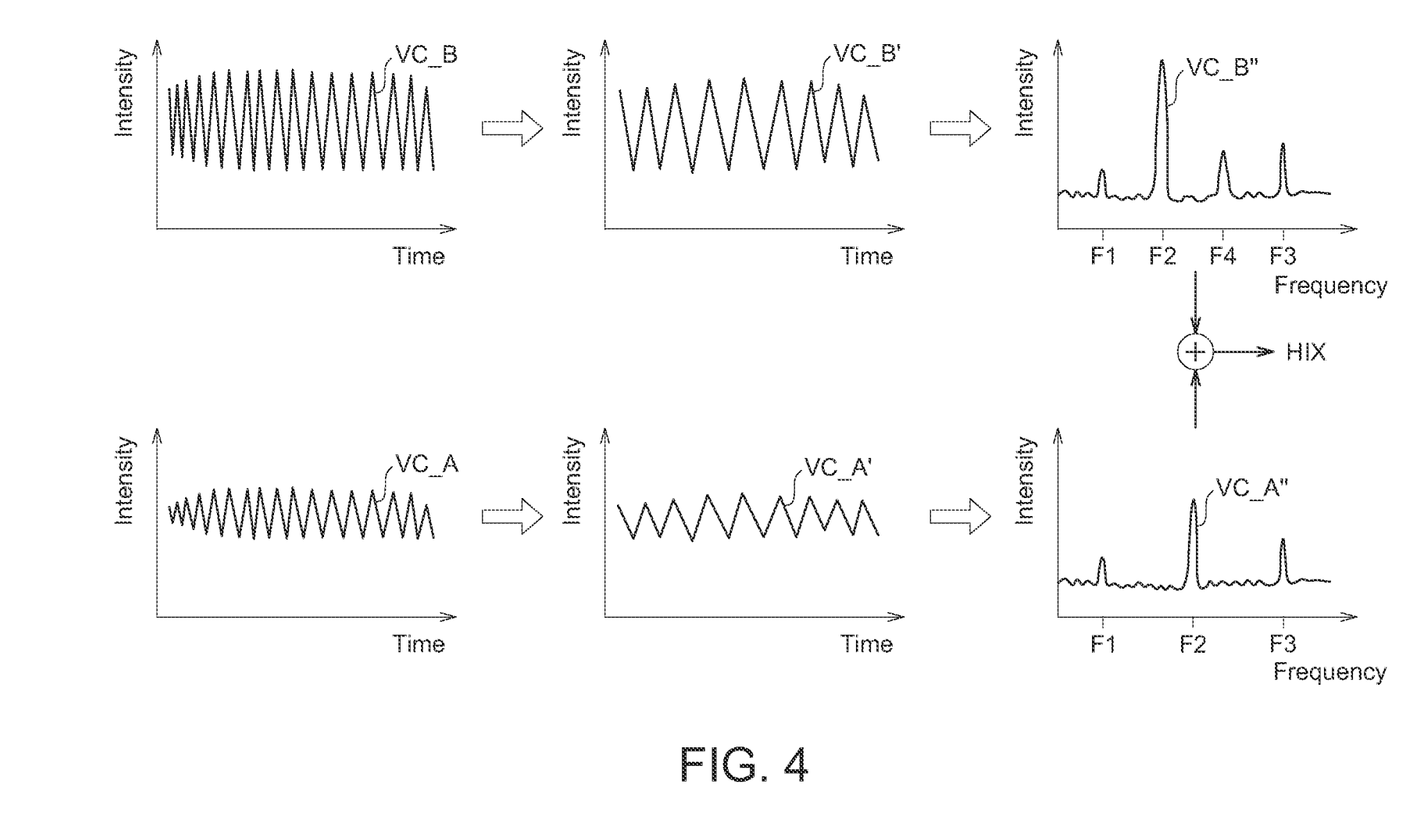

Refer to FIG. 2 to FIG. 4. FIG. 3 is a flowchart of a pump health analysis method according to an embodiment. FIG. 4 exemplifies each step of FIG. 3. In step S110, a standard vibration curve VC_A of a sample pump 800A is obtained by a data reception unit 110. The standard vibration curve VC_A is obtained by a vibration sensor 810A arranged on the sample pump 800A. Although the sample pump 800A is at the best state, it still has a certain degree of vibrations. The standard vibration curve VC_A records the vibration situation of the sample pump 800A within 0.2, 0.3, 0.4, or 0.5 seconds.

Next, the method proceeds to step S120, part of the standard vibration curve VC_A whose frequency if higher than 1K Hz is filtered out by the filter unit 120. The frequencies higher than 1K Hz normally are noises, therefore the filter unit 120 filter out these noises to increase the accuracy in subsequent analysis. As indicated in FIG. 2 and FIG. 4, after the standard vibration curve VC_A is inputted to the filter unit 120, the standard vibration curve VC_A is filtered to obtain a standard vibration curve VC_A'. In an embodiment, step S120 can be omitted and the standard vibration curve VC_A can be directly inputted to the conversion unit 130.

Then, the method proceeds to step S130, the standard vibration curve VC_A' (or standard vibration curve VC_A) is converted from a time domain to a frequency domain by the conversion unit 130 to obtain a first frequency distribution curve VC_A". In the present embodiment, the conversion unit 130 converts the standard vibration curve VC_A' (or standard vibration curve VC_A) using a Fourier transform technique. The first frequency distribution curve VC_A" records accumulative intensities of each frequency band. In the example of FIG. 4, the first frequency distribution curve VC_A" has peaks at frequencies F1, F2, and F3.

Then, the method proceeds to step S140, a sample vibration curve VC_B of the sample pump 800B is obtained by the data reception unit 110. The sample vibration curve VC_B is obtained by a vibration sensor 810B arranged on the sample pump 800B. Normally, after a long period of operation, the vibration situation of the sample pump 800B may change. The sample vibration curve VC_B records the vibration situations of the sample pump 800B within 0.2, 0.3, 0.4, or 0.5 seconds. To compare the sample pump 800B with the sample pump 800A, the time lengths recorded in the sample vibration curve VC_B are the same as that recorded in the standard vibration curve VC_A.

Next, the method proceeds to step S150, part of the sample vibration curve VC_B whose frequency is higher than 1K Hz is filtered out by the filter unit 120. The frequencies higher than 1K Hz normally are noises, therefore the filter unit 120 filter off these noises to increase the accuracy of subsequent analysis. As indicated in FIG. 2, FIG. 4, after the sample vibration curve VC_B is inputted to the filter unit 120, the sample vibration curve VC_B is filtered to obtain a sample vibration curve VC_B'. In an embodiment, step S180 can be omitted and the sample vibration curve VC_B can be directly inputted to the conversion unit 130. To maintain a consistent benchmark of comparison, step S120 and step S150 must be concurrently deleted or maintained.

Then, the method proceeds to step S160, the sample vibration curve VC_B' (or sample vibration curve VC_B) is converted from the time domain to the frequency domain by the conversion unit 130 to obtain a second frequency distribution curve VC_B". In the present embodiment, the conversion unit 130 converts the sample vibration curve VC_B' (or sample vibration curve VC_B) using the Fourier transform technique. The second frequency distribution curve VC_B" records accumulative intensities of each frequency band. In the example of FIG. 4, the second frequency distribution curve VC_B" has peaks at frequencies F1, F2, F3 and F4. In comparison to the first frequency distribution curve VC_A", the second frequency distribution curve VC_B" has one more frequency peak, and the intensity at the frequency F2 is significantly stronger than that in the first frequency distribution curve VC_A".

Next, the method proceeds to step S170, the similarity analysis unit 170 compares the first frequency distribution curve VC_A" and the second frequency distribution curve VC_B" by using a cosine similarity algorithm to obtain a health index IX_H of the sample pump 800B.

Figure 5:
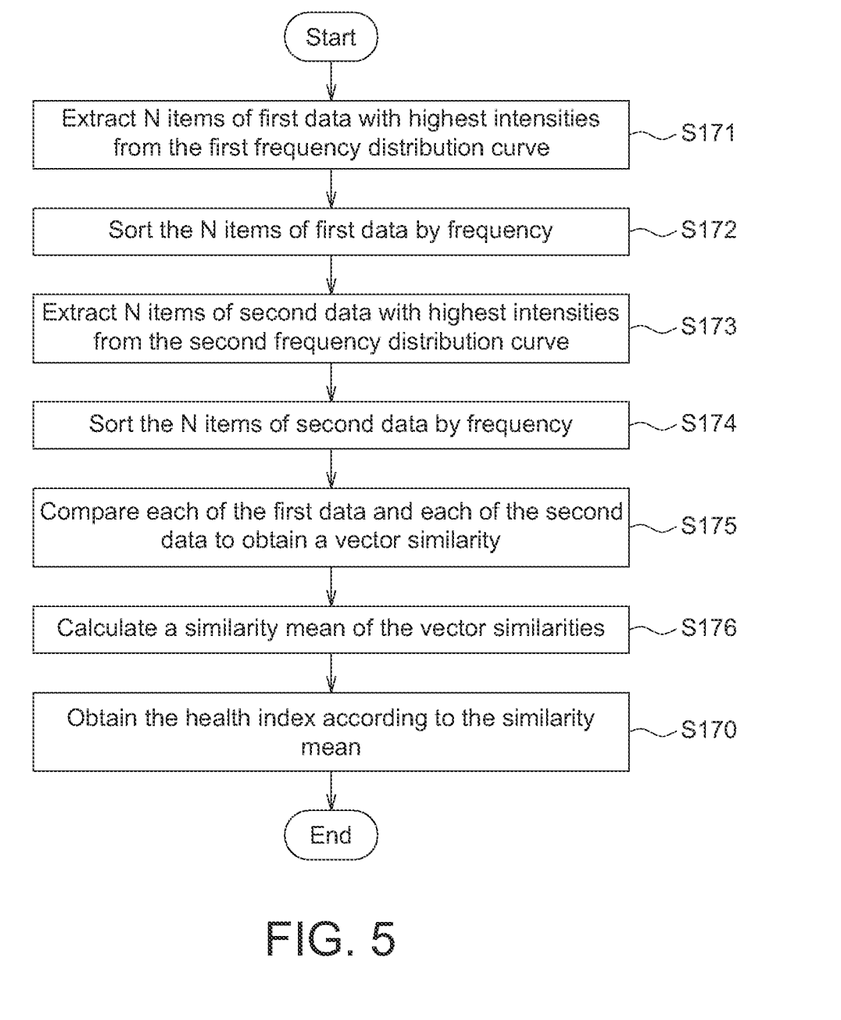
FIG. 5 is a detailed flowchart of step S170 according to an embodiment.

Refer to FIG. 2 and FIG. 5. FIG. 5 a detailed flowchart of step S170 according to an embodiment. Step S170 includes steps S171 to S177. In step S171, N items of first data with N highest intensities are extracted from the first frequency distribution curve VC_A" by the extractor 171. N is such as 100. Take Table 1 for instance. The first frequency scope corresponding to each item of data of the first frequency distribution curve VC_A" is such as 3.6 Hz. The first frequency distribution curve VC_A" is exemplarily divided into 278 items of data, and the first 100 items of the first data with the 100 highest intensities are extracted from the 278 items of data and defined as the first data DA_i.

TABLE 1

| Frequency (Hz) | Intensity (dB) | Extracted? |
|---|---|---|
| 0-3.6 | XX | |
| 3.6-7.2 | XXX | V |
| . . . | . . . | |
| 993.6-997.2 | XXX | V |
| 997.2-1000 | XX | |

Next, the method proceeds to step S172, the sorter 172 sorts these first data DA_i by frequency. For instance, these first data DA_i are sorted using a quick sorting method.

Then, the method proceeds to step S173, the N items of the second data with the N highest intensities are extracted from the second frequency distribution curve VC_B" by the extractor 171. N is such as 100. The second frequency scope corresponding to each item of data of the second frequency distribution curve VC_B" is also 3.6 Hz. The second frequency distribution curve VC_B" is exemplarily divided into 278 items of data, and the first 100 items of second data with the 100 highest intensities are extracted from the 278 items of data and defined as the second data DB_i.

Next, the method proceeds to step S174, he sorter 172 sorts these second data DB_i by frequency. For instance, these second data DB_i are sorted using the quick sorting method.

Then, the method proceeds to step S175, the comparator 175 compares each of the first data DA_i and each of the corresponding second data DB_i to obtain a vector similarity. The frequency and the intensity of each item of the first data DA_i form a vector; the frequency and the intensity of each item of the second data DB_i also form a vector. The comparator 175 compares the N corresponding vectors to obtain N items of vector similarities SD_i.

Next, the method proceeds to step S176, a similarity mean SDM of these vector similarities SD_i is calculated by the mean calculator 176. In the present step, a weighted average of these vector similarities SD_i can be calculated by the mean calculator 176 according to the sensitivity information. For instance, if a particular model of pump has significant vibration within certain particular frequency scopes, this indicates that this pump will be broken soon. Meanwhile, a larger weight can be assigned to this particular frequency scope through the setting of the sensitivity information.

Then, the method proceeds to step S177, a health index IX_H is obtained by the index creator 177 according to the similarity mean SDM. The relationship between the similarity mean SDM and the health index IX_H is such as a curve, and the index creator 177 can obtain a corresponding health index IX_H according to the similarity mean SDM.

After obtaining the health index IX_H, the pump health analysis device 100 can immediately determine the health situation of the health index IX_H. In the present embodiment, as long as the data of a standard vibration curve VC_A of the sample pump 800A is stored in advance, the sample pump 800B can be compared and analyzed every 0.3 second. The pump health analysis method of the present embodiment is extremely fast, and does not need to be trained with big data which is time-consuming, and therefore is very suitable to be used in the real-time monitoring of production line. If the health situation of a pump is found to be unsatisfactory, this pump can be replaced immediately to avoid causing problems to the manufacturing process.

As indicated in FIG. 2, the health index IX_H can also be inputted to the machine learning model 180 to perform training. The machine learning model 180 can be trained with such as 12 characteristic indexes IX_j (such as temperature, total time of use, sound, and the number of times of oil change) and the historical data of the health index IX_H. The obtained characteristic indexes IX_j and the health index IX_H can be inputted to the trained machine learning model 180 to predict a residual lifetime of the sample pump 800B.

According to the above embodiments, the pump health analysis device 100 can quickly analyze the health state of the sample pump 800B using the cosine similarity algorithm according to an analysis of comparison between the vibration state of the sample pump 800B and the vibration state of the sample pump 800A.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A pump health analysis method, comprising:
    obtaining a standard vibration curve of a standard pump;
    converting the standard vibration curve from a time domain to a frequency domain to obtain a first frequency distribution curve;
    obtaining a sample vibration curve of a sample pump;
    converting the sample vibration curve from the time domain to the frequency domain to obtain a second frequency distribution curve; and
    comparing the first frequency distribution curve and the second frequency distribution curve by using a cosine similarity algorithm to obtain a health index of the sample pump;
    wherein the step of comparing the first frequency distribution curve and the second frequency distribution curve comprises:
        extracting N items of first data with highest intensities from the first frequency distribution curve;
        sorting the N items of first data by frequency;
        extracting N items of second data with highest intensities from the second frequency distribution curve;
        sorting the N items of second data by frequency;
        comparing each of the first data and each of the second data to obtain a vector similarity;
        calculating a similarity mean of the vector similarities; and
        obtaining the health index according to the similarity mean.

2. The pump health analysis method according to claim 1, further comprising:
    filtering out part of the standard vibration curve whose frequency is higher than 1K Hz; and
    filtering out part of the sample vibration curve whose frequency is higher than 1K Hz.

3. The pump health analysis method according to claim 1, wherein in the step of calculating the similarity mean of the vector similarities, a weighted average of the vector similarities is calculated according to a frequency sensitivity information.

4. The pump health analysis method according to claim 1, wherein the first data correspond to a plurality of first frequency scopes having identical width; the second data correspond to a plurality of second frequency scopes having identical width.

5. The pump health analysis method according to claim 4, wherein each of the first frequency scopes has a width of 3.6 Hz; each of the second frequency scopes has a width of 3.6 Hz.

6. The pump health analysis method according to claim 1, wherein N is 100.

7. The pump health analysis method according to claim 1, wherein the first data are sorted via a quick sorting algorithm; the second data are sorted via the quick sorting algorithm.

8. The pump health analysis method according to claim 1, wherein the health index is inputted to a machine learning model for training, and the machine learning model is used to predict a residual lifetime of the sample pump.

9. The pump health analysis method according to claim 1, wherein the standard vibration curve records vibrations of the standard pump within 0.3 second, and the sample vibration curve records vibrations of the sample pump with 0.3 second.

10. A pump health analysis device, comprising:
    a data reception unit configured to obtain a standard vibration curve of a standard pump and a sample vibration curve of a sample pump;
    a conversion unit configured to convert the standard vibration curve from a time domain to a frequency domain to obtain a first frequency distribution curve, and to convert the sample vibration curve from the time domain to the frequency domain to obtain a second frequency distribution curve; and
    a similarity analysis unit configured to compare the first frequency distribution curve and the second frequency distribution curve by using a cosine similarity algorithm to obtain a health index of the sample pump;
    wherein the similarity analysis unit comprises:
        an extractor configured to extract N items of first data with highest intensities from the first frequency distribution curve and to extract N items of second data with highest intensities from the second frequency distribution curve;

a sorter configured to sort the first data and the second data by frequency;

a comparator configured to compare each of the first data and each of the second data to obtain a vector similarity;

a mean calculator configured to calculate a similarity mean of the vector similarities; and an index creator configured to obtain the health index according to the similarity mean.

11. The pump health analysis device according to claim 10, further comprising:

a filter unit configured filter out part of the standard vibration curve and part of the sample vibration curve whose frequency is higher than 1K Hz.

12. The pump health analysis device according to claim 10, wherein the mean calculator calculates a weighted average of the vector similarities according to a sensitivity information.

13. The pump health analysis device according to claim 10, wherein the first data correspond to a plurality of first frequency scopes having identical width; the second data correspond to a plurality of second frequency scopes having identical width.

14. The pump health analysis device according to claim 13, wherein each of the first frequency scopes has a width of 3.6 Hz; each of the second frequency scopes has a width of 3.6 Hz.

15. The pump health analysis device according to claim 10, wherein N is 100.

16. The pump health analysis device according to claim 10, wherein the first data are sorted via a quick sorting algorithm; the second data are sorted via the quick sorting algorithm.

17. The pump health analysis device according to claim 10, wherein the health index is inputted to a machine learning model for training, and the machine learning model is used to predict a residual lifetime of the sample pump.

18. The pump health analysis device according to claim 10, wherein the standard vibration curve records vibrations of the standard pump within 0.3 second, and the sample vibration curve records vibrations of the sample pump with 0.3 second.

* * * * *